United States Patent Office

3,551,159
Patented Dec. 29, 1970

3,551,159

PROCESS FOR HARDENING GELATINE

Alfred Froehlich, Marly-le-Grand, Switzerland, assignor to Ciba Limited, Basel, Switzerland, a company of Switzerland

No Drawing. Filed May 15, 1967, Ser. No. 638,591
Claims priority, application Switzerland, May 25, 1966, 7,582/66
**Int. Cl. G03c *1/30***
U.S. Cl. 96—111 4 Claims

ABSTRACT OF THE DISCLOSURE

The present invention provides a process for hardening gelatine, especially in the form of a photographic emulsion. The hardening of gelatine requires special compounds capable of reacting with gelatine. The new hardeners are reaction products of acylisocyanates with compounds capable of reacting with a compound containing one or more exchangeable hydrogen atoms or reaction products of acid amides with special acylisocyanates. These new hardeners correspond to the formula

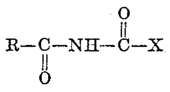

in which R represents a radical which in addition to 2 carbon atoms, contains 2 to 4 hydrogen atoms and as many halogen atoms as will bring the sum of hydrogen atoms plus any halogen atoms present to 3 or 5, and X represents a radical bound to the —CO— group through a hetero atom and which is capable of reacting with a compound containing one or more exchangeable hydrogen atoms. The new compounds are generally soluble in water and the reaction with gelatine proceeds easily and in the usual manner.

The present invention provides a process for hardening gelatine, wherein gelatine, especially in the form of photographic emulsions, is reacted with a compound of the formula (1)

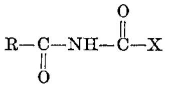

in which R represents a radical which, in addition to 2 carbon atoms, contains 2 to 4 hydrogen atoms and as many halogen atoms as will bring the sum of hydrogen atoms plus any halogen atoms present to 3 or 5, and X represents a radical bound to the —CO— group through a hetero atom and which is capable of reacting with a compound containing one or more exchangeable hydrogen atoms.

The present invention also provides compounds of the above Formula 1 in which R and X are as defined above.

The radical R thus consists solely of carbon, hydrogen and, if desired or required, halogen atoms, the halogen atoms being bromine and/or chlorine atoms. Preferred radicals R are saturated or unsaturated radicals having 2 hydrogen atoms bound to the $\beta$ carbon atom. If a saturated halogenated alkyl radical is present it preferably contains at least one halogen atom in $\beta$-position. The radicals R corresponding to the following three formulae (2)

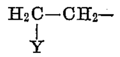

(3)

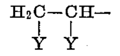

or (4) $H_2C{=}CH-$ in which Y represents a chlorine or a bromine atom, have been found to be specially suitable.

The radical X is bound to the —CO— group through a hetero atom, that is to say, an atom other than a carbon atom which may be a member of a heterocyclic ring. A hetero atom may thus be, for example, a sulphur atom, but especially an oxygen or a nitrogen atom. In addition to the said hetero atom, the radical X contains the reactive component of the kind defined above, it being possible for the hetero atom and the reactive component to be connected by different kinds of bond. Thus, the radical X, which contains, for example, 1 to 4, but preferably 2 or 3, carbon atoms, comprises a terminal, reactive component and a connecting link. Radicals having connecting links of the formula $—O—CH_2—$may be designated ester-like radicals, those having a connecting link of the formula —O—CO— may be designated anhydride-like radicals, those having a connecting link of the formula $$—NH—CH_2—$$

maybe designated amide-like radicals and those having a connecting link of the formula —NH—CO or $—NH—SO_2$ or $—NH{=}(CH_2)_2$ may be designated imide-like radicals.

Molecule components which are capable of forming covalent bonds with nucleophilic reactants, for example, hydroxyl, sulphohydryl, primary or secondary amino groups or reactive methylene groups, by addition or substitution reactions are, for example, radicals of the following kinds of compound: aliphatic aldehydes, epoxy compounds, ethyleneimine compounds, $\alpha,\beta$-ethylenic unsaturated carboxylic acids, $\alpha,\beta$- or $\beta,\gamma$-ethylenic unsaturated sulphonic acids, aliphatic, $\alpha,\beta$-unsautrated compounds and $\alpha$- and $\beta$-halogenated carboxylic acids.

Compounds worthy of special mention are those of the Formula 1 in which the radical —X corresponds to one of the following formulae (5)

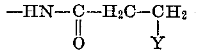

(6)

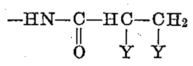

(7)

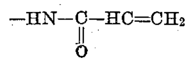

(8)

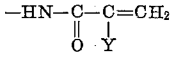

(9)

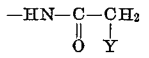

(10)

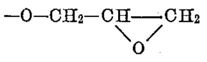

(11)

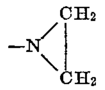

or

(12) —O—$CH_2$—CHO in which Y represents a chlorine or a bromine atom.

It is, however, also possible to use compounds of the Formula 1 in which the radical X represents

—$OCH_2CH_2Y$

—$OCH=CH_2$, —$NHCOCH(CH_3)=CH_2$,

—$NHSO_2CH=CH_2$

—$NHSO_2CH_2CH_2Y$ or, for example,

—OCO—CCl=CCl—CHO and other radicals capable of reacting with exchangeable hydrogen atoms belonging to proteins, for example, amino derivatives of acetals and carboxylic anhydrides or bis-($\beta$-chlorethylamine).

Compounds of the Formula 1 may be prepared by known methods, for example, by additively combining an acylisocyanate of the formula

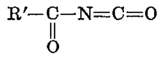

in which R′ represents a saturated radical which, in addition to 2 carbon atoms, contains 2 to 4 hydrogen atoms and at least 1 halogen atom, the sum of the hydrogen atoms plus the halogen atoms being 5, with compounds of the formula H—X, in which X is bound to the —CO— group through its hetero atom, and represents a radical capable of reacting with a compound containing one or more exchangeable hydrogen atoms, and, if necessary, eliminating hydrogen halide from the radical R′.

Another method of preparation is to add to an acid amide of the formula (14)

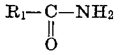

in which $R_1$ represents a radical which, in addition to 2 carbon atoms, contains 2 to 4 hydrogen atoms and one or more halogen atoms such that the sum of the hydrogen atoms plus the halogen atoms that may be present is 3 or 5, an acylisocyanate of the formula (15)

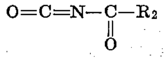

in which $R_2$ represents a radical capable of reacting with a compound containing one or more exchangeable hydrogen atoms and which does not correspond to the definition of $R_1$.

In these methods of preparation the starting materials of the Formula 13 to be used are the isocyanates having radicals R′ of the formulae $H_2CBr$—HCBr— and $H_2CCl$—$CH_2$— it being specially easy to eliminate hydrogen halide from these with formation of $H_2C=CH$ and $H_2C=CBr$ groups; the starting material of the Formula 14 to be used is the acrylamide of the formula $H_2C=CH$—CO—$NH_2$, and the starting material of the Formula 15 to be used is the isocyanate of the formula O=C=N—OC—$CH_2Cl$.

The reactions may be represented by the following reaction equations:

(Ia)

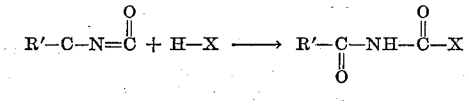

(Ib)

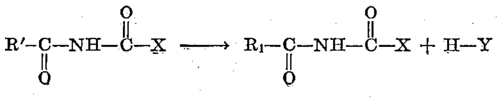

e.g.

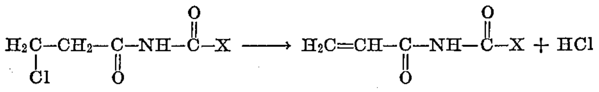

(II)

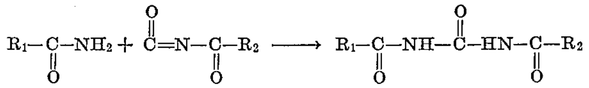

The compounds of the Formula 1 may also be used, for example, as cross-linking agents in the textile and leather industries, in paper-making, and in the plastics, glue and gelatine industries. Especially, they are used as hardeners for gelatine, especially in gelatine coatings in photographic materials.

The radicals X of the compounds of the Formula 1 react with the hydroxyl, sulphohydryl, amino or imino groups of the gelatine with formation of homopolar bonds.

Reaction between the gelatine and the compounds of the Formula 1 generally proceeds easily and in the usual manner. These compounds are generally readily soluble in water-soluble organic solvents, for example, methanol and ethanol, and are added to the gelatine in the form of approximately 10% solutions. The —CO—NH—CO— groups make the hardening agents sufficiently hydrophilic for them to be used in the gelatine in large amounts without precipitating, or crystallizing out. For example, a solution of the hardening agent in ethanol or methanol may be combined with gelatine at room temperature or at a slightly elevated temperature, and the gelatine, which may contain silver halide and/or other materials used in the production of photographic images, may be cast on a support in the usual manner to form a coating and then dried if necessary. The coating may then be left to stand at an elevated temperature for a certain period of time, for example, up to 18 hours, or at room temperature. During this period hardening takes place quickly and at an increasing rate, and the melting point of the gelatine is raised considerably, for example, by 25° C. to 60° C. This elevation of melting point is largely independent of temperature, period of reaction or constitution. The desired degree of hardening can advantageously be determined by the amount of hardening agent. The amount of hardening agent used, based on the amount of dry gelatine, is advantageously 0.5 to 5%. The hardening process is clearly a function of a high degree of cross-linkage. The hardening process impairs neither the photographic properties of the light-sensitive layers nor the reactivity of dyestuff couplers or dyestuffs. Furthermore, the hardeners produce substantially no change in the pH value or the viscosity of the gelatine. The new hardeners have a special advantage in that they confer an adequate degree of hardness on the gelatine when used in low concentrations after a period of only 18 to 24 hours, which means that test processing of the castings may be carried out immediately subsequent to manufacture, even at an elevated temperature or in processing baths having a powerful action.

Almost all the new hardeners can be stored. Compounds of the Formula 1 that are free from halogenated alkyl groups have the additional advantage of not charging the pH value of the emulsion during the hardening process.

The following manufacturing instructions and examples illustrate the invention. Unless otherwise stated, the parts and percentages are by weight. The relationship between parts by volume and parts by weight is the same as that of the millilitre to the gram.

MANUFACTURING INSTRUCTIONS (A) 12.4 parts of $\beta$-chloropropionylisocyanate are dissolved in 150 parts by volume of absolute diethylether, and then 6.6 parts of finely powdered and dried acrylamide are added. The batch is stirred for about 10 minutes at 40° C. until the acrylamide is dissolved, and then stirring is continued at room temperature. After 1 to 2 hours, considerable precipitation of colourless crystals commences. After 24 hours, the compound of the formula (16)

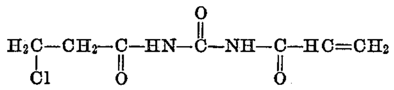

is isolated by suction filtration, washed with ether and recrystallized from alcohol in the presence of charcoal.

Yield: 13.5 parts; melting point: 121° C.

*Analysis*.—$C_7H_8O_3N_2Cl$. Calculated (percent): C, 41.00; H, 4.40; N, 13.69; Cl, 17.34. Found (percent): C, 41.2; H, 4.5; N, 13.5; Cl, 17.2.

(B) 20.5 parts of the compound of the Formula 16 are suspended in 200 parts by volume of absolute acetone, and then 12 parts of absolute triethylamine are added at room temperature while stirring. The batch is stirred for 24 hours, the triethylamine hydrochloride which precipitates is removed by suction filtration, washing is effected with acetone, and the filtrate is dried in vacuo at 25 to 30° C. The residue is triturated with 250 parts by volume of water, the pH is adjusted to 3 with concentrated hydrochloric acid, the batch is suction filtered, the filter residue is washed with water until the washings run neutral, and the compound of the formula (17)

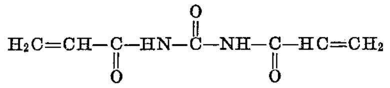

so obtained is dried in vacuo at 30° C.

Yield: 13.5 parts. A test sample recrystallized from methanol melts at 144° C.

*Analysis*.—$C_7H_8O_3N_2$. Calculated (percent): C, 50.00; H, 4.80; N, 16.66. Found (percent): C, 49.80; H, 4.90; N, 16.67.

Microhydrogenation indicates the presence of two double bonds.

(C) 22.7 parts of α,β-dibromopropionylisocyanate are dissolved in 200 parts by volume of absolute diethylether, and then 6.5 parts of acrylamide are added while stirring. Dissolution is complete after 30 minutes. The batch is stirred for 24 hours and then the ether is removed in vacuo at a bath temperature of 25° C. The residue is triturated with benzene and suction filtered.

27 parts of the compound of the formula (18)

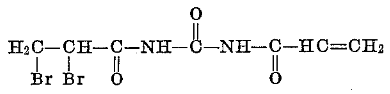

are obtained in the form of a white powder melting at 105 to 107° C.; decomposition takes place at 140° C. A test sample recrystallized from methanol melts at 107° C.

*Analysis*.—$C_7H_8O_3N_2Br_2$. Calculated (percent): C, 25.64; H, 2.46; N, 8.54; Br, 48.73. Found (percent): C, 25.7; H, 2.4; N, 8.7; Br, 48.7.

(D) 21.6 parts of β-chloropropionic acid amide are dissolved at room temperature in 500 parts by volume of absolute acetonitrile, and then 26.4 parts of β-chloropropionylisocyanate are added. The batch is stirred for 48 hours at room temperature, the acetonitrile is removed in vacuo at a bath temperature of 25°, the residue is triturated with ether and then suction filtered.

32 parts of white powder are obtained. The powder is recrystallized from 50 parts by volume of methanol in the presence of 1 part of charcoal, and 27 parts of the compound of the formula (19)

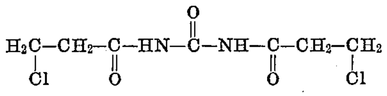

are obtained.

*Analysis*.—$C_7H_{10}O_3N_2Cl_2$.—Calculated (percent): C, 34.90 H, 4.18; N, 11.62; Cl, 29.50. Found (percent): C, 35.3; H, 4.2; N, 11.6; Cl, 29.9.

(E) A mixture comprising 3.55 parts of acrylamide, 6 parts of chloracetylisocyanate and 50 parts by volume of absolute acetonitrile is boiled for 5 hours in a water bath, cooled to 0° C., suction filtered, the residue is washed with cold acetonitrile and the compound of the formula (20)

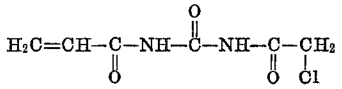

so obtained is recrystallized from 100 parts by volume of water in the presence of 0.5 parts of charcoal.

Yield: 4 parts: melting point: 151° C.

*Analysis*.—$C_6H_7O_3N_2Cl$. Calculated (percent): C, 37.81; H, 3.70; Cl, 18.90. Founr (percent): C, 37.8; H, 3.6; Cl, 18.9.

(F) 13.4 parts of β-chloropropionylisocyanate are dissolved in 150 parts by volume of absolute diethylether, and then 3.9 parts of ethyleneimine, dissolved in 50 parts by volume of absolute diethylether, are added at −10° C. while stirring. The bath is stirred for 24 hours at room temperature, suction filtered, the residues is washed with ether, and the compound of the formula (21)

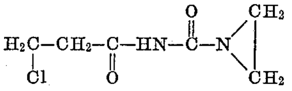

is recrystallized from methanol.

Yield: 10.3 parts; melting point: 111° C.

*Analysis*.—$C_6H_8O_2N_2Cl$. Calculated (percent): C, 40.70; H, 5.08; N, 15.80; Cl, 20.30. Found (percent): C, 40.9; H, 5.2; N, 15.9; Cl, 20.5.

(G) 14.8 parts of glycide are dissolved in 100 parts by volume of absolute diethylether. 26.8 parts of β-chloropropionylisocyanate, dissolved in 20 parts by volume of absolute diethylether, are added dropwise at 0° C. Precipitation of white crystals commences after a short time. When the whole amount has been added the batch is stirred for 2 hours at room temperature, the compound of the formula (22)

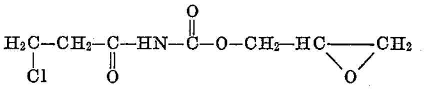

is isolated by suction filtration and then washed with ether.

Yield: 26 parts. A sample recrystallized from methanol melts at 92° C.

*Analysis*.—$C_7H_{10}O_4NCl$. Calculated (percent): C, 40.50 H, 4.86; N, 6.75; Cl, 17.08. Found (percent): C, 40.07; H, 4.90; N, 6.90; Cl, 16.80.

(H) 5.2 parts of the compound of the Formula 22 are stirred together with 45 parts by volume of absolute methanol and 3 parts by volume of triethylamine for 24 hours at room temperature. The triethylamine hydrochloride which precipitates is removed by suction filtration, and the mother liquor is concentrated to 10 parts by volume in vacuo at 30° C. The material is cooled to 0° C., suction filtered, and the compound of the formula (23)

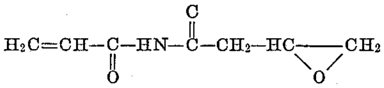

is washed with a small amount of methanol and ether.

Yield: 3.1 parts; melting point: 103° C.

*Analysis*.—(percent): C, 49.12; H, 5.20; N, 8.18. Found (percent): C, 48.8; H, 5.3; N, 8.2.

(I) A solution of 13 parts of β-chloropropionylisocyanate, dissolved in 20 parts by volume of absolute diethylether, is added to 5.6 parts of glycolaldehyde in 70 parts by volume of asolute acetonitrile. The temperature of the mixture rises and, after a short time, a large amount of white crystals precipitates. The batch is stirred for 2 hours at room temperature, and then for 1 hour at a water-bath temperature of 50° C. It is then cooled and the compound of the formula (24)

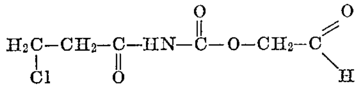

is isolated by suction filtration and washed with ether.

Yield: 12.9 parts; melting point: 165° C.

*Analysis.*—$C_6H_8O_4NCl$. Calculated (percent): Cl, 18.56. Found (percent): Cl, 18.7.

(K) 16.9 parts of mucochloric acid are dissolved in 160 parts by volume of absolute diethylether, and then 13.4 parts of β-chloropropionylisocyanate, dissolved in 20 parts by volume of absolute ether, are added at room temperature. The batch is stirred for 30 hours at room temperature, the compound of the formula (25)

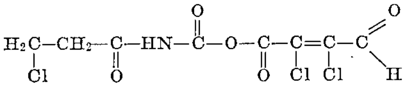

is isolated by suction filtration and then washed with ether.

Yield: 19 parts; melting point: 125° C.

*Analysis.*—$C_7H_6O_5NCl_3$. Calculated (percent): Cl, 35.31. Found (percent): Cl, 35.4.

(L) 12.5 parts of bromoethanol are dissolved in 100 parts by volume of absolute diethylether. 13.4 parts of β-chloropropionylisocyanate, dissolved in 20 parts by volume of absolute diethylether, are added dropwise while cooling with ice. The batch is stirred for 2 hours at room temperature and then the compound of the formula (26)

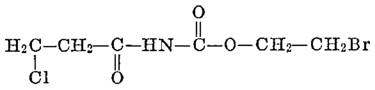

is isolated by suction filtration and washed with ether.

Yield: 22 parts; melting point after recrystallization from methanol: 116° C.

*Analysis.*—$C_6H_9NClBr$. Calculated (percent): C, 27.88; H, 3.51; N, 5.42; Cl, 13.71; Br, 30.91. Found (percent): C, 28.2; H, 3.6; N, 5.5; Cl, 14.0; Br, 31.4.

(M) 10.36 parts of the compound of the Formula 26 are suspended in 150 parts by volume of absolute acetone; 15 parts of triethylamine are added and the batch is stirred for 18 hours at room temperature. The triethylamine-hydrobromide and the triethylamine-hydrochloride are removed by suction filtration (12.5 parts) and the mother liquor is evaporated in vacuo at a water-bath temperature of 25° C. The residue is taken up in 20 parts by volume of water, the batch is suction filtered, the residue is washed with water, and the compound of the formula (27)

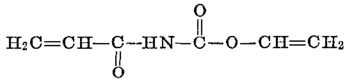

is recrystallized from methanol.

Melting point: 81° C.

*Analysis.*—$C_6H_7O_3N$. Calculated (percent): C, 51.06; H, 5.0; N, 9.93. Found (percent): C, 51.3; H, 5.2; N, 10.0.

EXAMPLE

A hardener solution is prepared from one of the compounds of the Formulae 16 to 24 indicated in manufacturing instructions A to M and the solvent indicated in the following table. The hardener solution is added to 20 cc. of a 10% aqueous solution of a commercial gelatine suitable for photographic purposes in an amount such that the gelatine contains 1 to 4% of hardener. The mixture is immediately cast on a piece of film measuring 18 cm. x 24 cm., allowed to set for 15 minutes and is then dried for 24 hours at 38° C. in circulating air at normal humidity. The film is then allowed to stand exposed to the air. The following table lists the results of a series of tests carried out in this manner.

| Manufacturing insutructions | Formula | Percent substance, based on gelatine | Solution | Melting point in ° C. after 18 hours |
|---|---|---|---|---|
| A | (16) | 1 | 10% in ethanol | 90 |
| | | 2 | | >95 |
| | | 3 | | >95 |
| | | 4 | | >95 |
| B | (17) | 1 | do | >95 |
| | | 2 | | >95 |
| | | 3 | | >95 |
| | | 4 | | >95 |
| C | (18) | 1 | 2.5% in ethanol | 81 |
| | | 2 | | 95 |
| | | 3 | | >95 |
| | | 4 | | >95 |
| D | (19) | 2 | 5% in ethanol | 87 |
| | | 4 | | 95 |
| E | (20) | 1 | 10% in ethanol | 48 |
| | | 2 | | 77 |
| | | 3 | | 85 |
| | | 4 | | 89 |
| F | (21) | 1 | 10% in dimethylformamide | 81 |
| | | 2 | | 89 |
| | | 3 | | >95 |
| | | 4 | | >95 |
| G | (22) | 1 | 10% in ethanol | 71 |
| | | 2 | | 81 |
| | | 3 | | 88 |
| | | 4 | | 93 |
| H | (23) | 1 | do | 78 |
| | | 2 | | 87 |
| | | 3 | | 89 |
| | | 4 | | 95 |
| I | (24) | 1 | 10% in dimethylformamide | 44 |
| | | 2 | | 91 |
| | | 3 | | 91 |
| | | 4 | | >95 |

I claim:

1. A process for hardening gelatine, which comprises reacting gelatine with 0.5 to 5% based on the amount of dry gelatine of a compound of the formula

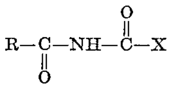

in which R represents a radical which, in addition to 2 carbon atoms, contains 2 to 4 hydrogen atoms and as many halogen atoms as will bring the sum of hydrogen atoms plus any halogen atoms present to a number selected from the group consisting of 3 and 5, and X represents a radical selected from the group consisting of

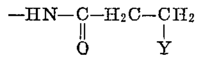

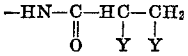

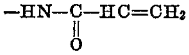

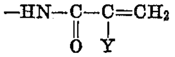

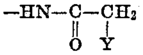

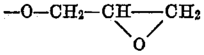

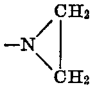

and $—O—CH_2—CHO$ in which Y represents a member selected from the group consisting of a chlorine atom and a bromine atom.

2. The process according to claim 1 which comprises reacting gelatine with a compound of the formula selected from the group consisting of

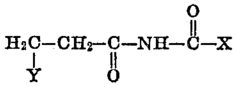

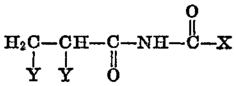

and

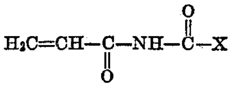

in which Y represents a member selected from the group consisting of a chlorine atom and a bromine atom, and X represents a radical of the formula selected from the group consisting of

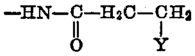

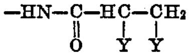

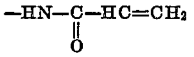

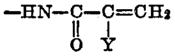

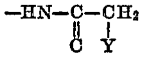

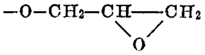

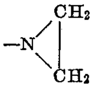

and $—O—CH_2—CHO$ in which Y has the meaning given above.

3. The process according to claim 1, which comprises reacting gelatine with a compound of the formula

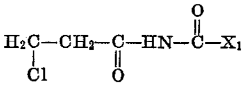

in which $X_1$ represents a radical of the formula selected from the group consisting of

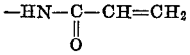

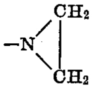

and $—O—CH_2—CHO$

4. The process according to claim 1 which comprises reacting gelatine with a compound of the formula

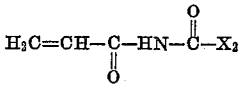

in which $X_2$ represents a radical of the formula selected from the group consisting of

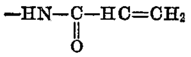

and

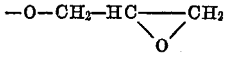

References Cited

UNITED STATES PATENTS 3,313,784 4/1967 Vrancken ........ 96—111X

FOREIGN PATENTS 1,305,988 7/1969 France .............. 96—111

NORMAN G. TORCHIN, Primary Examiner

R. E. FICHTER, Assistant Examiner

U.S. Cl. X.R.

106—125; 260—117, 453, 554